Figure 1:
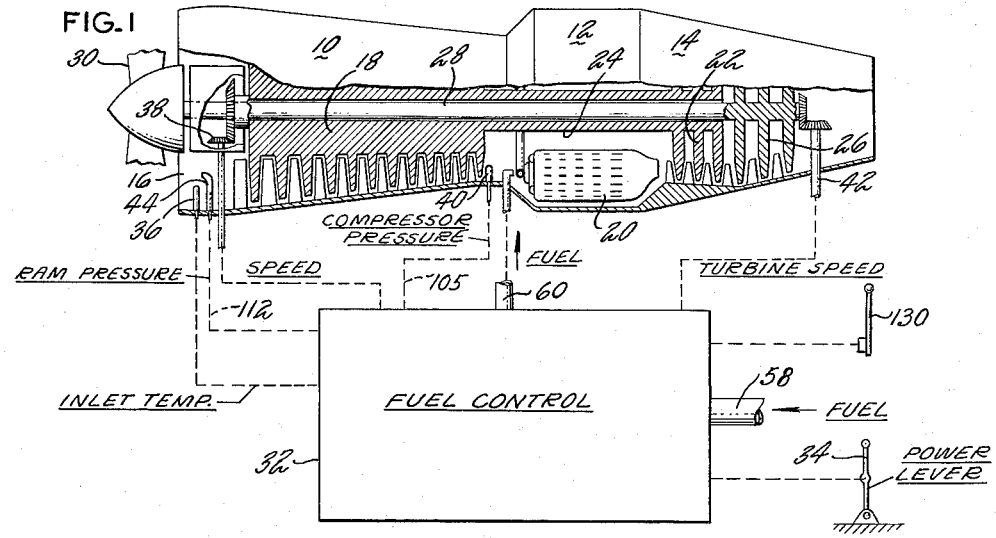

Aug. 22, 1961

W. E. FORTMANN 2,996,883

MEANS FOR LIMITING TORQUE IN A TURBO-PROP
ENGINE OR THE LIKE

Filed Nov. 15, 1957

INVENTOR
WILLIAM E. FORTMANN
BY Teller & McCormick
ATTORNEYS

United States Patent Office 2,996,883
Patented Aug. 22, 1961

2,996,883
MEANS FOR LIMITING TORQUE IN A TURBO-PROP ENGINE OR THE LIKE
William E. Fortmann, Farmington, Conn., assignor to United Aircraft Corporation, East Hartford, Conn., a corporation of Delaware
Filed Nov. 15, 1957, Ser. No. 696,831
3 Claims. (Cl. 60—39.28)

This invention relates to a fuel control for a turbo-prop power plant or the like and, more specifically, to means within the fuel control for limiting torque output of the engine in keeping with the torque limitations of the propeller drive mechanism and gears, etc.

It is the general object of the invention to provide means for the aforesaid purpose and which operates automatically in response to certain parameters of power plant operation, such as ram air pressure and turbine speed, to provide a maximum limit on fuel flow which will not permit the power plant to provide a torque output of which it may be capable and which may exceed the torque capacity of the propeller drive mechanism or some other mechanism operated by the power plant.

The drawing shows a preferred embodiment of the invention and such embodiment will be described, but it will be understood that various changes may be made from the construction disclosed, and that the drawing and description are not to be construed as defining or limiting the scope of the invention, the claims forming a part of this specification being relied upon for that purpose.

Figure 2:
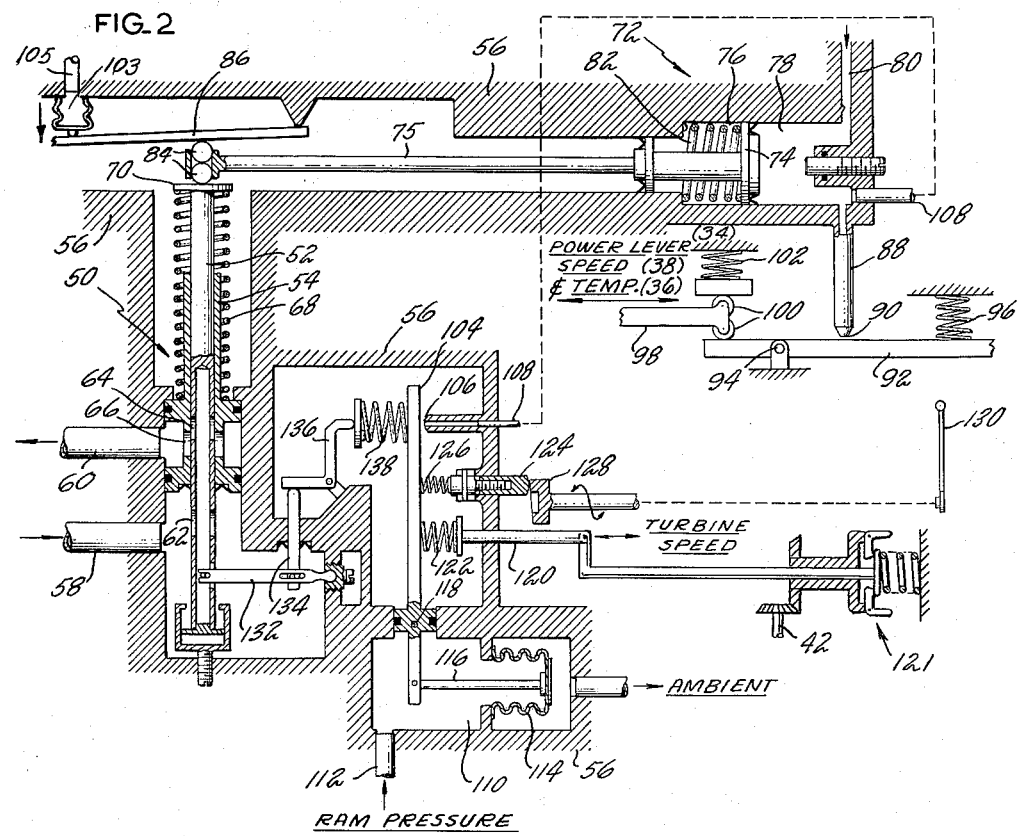

Of the drawing,

FIG. 1 is a schematic view of a turbo-prop engine of the type wherein torque can be limited by means provided in accordance with the present invention and which is incorporated in the fuel control mechanism for the engine; and FIG. 2 is a somewhat schematic view of the fuel throttle valve and servo mechanism therefor and the torque limiting mechanism provided in accordance with the present invention which modifies operation of the throttle valve.

As shown schematically in FIG. 1, a turbine engine for driving an aircraft propeller or a helicopter rotor may comprise three sections, namely, a compressor section 10, a combustion section 12, and a turbine section 14. Ram air is introduced to the compressor section 10 through a nose opening 16 and passes through a compressor 18 into the combustion chamber 12 wherein fuel is introduced and ignited with air in one or more burners 20. In a turbo-prop or helicopter engine of this type, the turbine section 14 generally includes a first turbine 22 which is connected as by a shaft 24 with the compressor rotor 18 and it may also include a second turbine 26 which is connected as by a shaft 28 with the propeller or rotor 30. The last mentioned turbine 26 is oftentimes referred to as a free turbine because it is not directly connected with the compressor rotor, the shaft 28 of the free turbine generally extending through the first turbine shaft 24 which is hollow.

In operation of a power plant of the aforedescribed type, its capacity may exceed the safe limits of torque which can be applied to the propeller or rotor gearing, etc. It is known that torque increases with air pressure and it is also known that torque increases with a decrease in turbine speed. Therefore, in accordance with the present invention means are provided for sensing ram air pressure and for sensing speed of the propeller driving turbine, which constitute parameters of power plant operation and which provide signals for a fuel control apparatus, designated in block diagram by the reference numeral 32, for the purpose of controlling the fuel flow to the engine whereby to adjust or limit the engine output to the torque limitations.

The fuel control mechanism 32 is disposed between a source of fuel under pressure and the power plant and it operates normally to control the fuel flow to the engine in response to signals or parameters in addition to the torque controlling signals mentioned above. That is, the fuel control mechanism 32 includes a fuel flow throttle valve which is positioned in response to a mechanical signal from a power lever 34 and is influenced or scheduled against an air temperature signal from a temperature sensing element 36 and is further influenced by a compressor and first turbine speed signal transmitted through gearing indicated generally at 38 and throttle valve operation is additionally influenced by a pressure signal from a pressure sensing element 40 which is located in the engine to sense compressor discharge pressure. Invention is not claimed here for the provision of a throttle valve which is operated responsive to power lever, air temperature, air pressure, and turbine and compressor speed signals. The present invention embraces means such as the gearing 42 providing a signal responsive to speed of the so-called free turbine 26 and means such as the element 44 for developing and transmitting a signal in keeping with ram pressure to the fuel control mechanism 32 wherein those signals are utilized to operate means which modifies action of the fuel throttle valve to limit fuel flow to the engine in keeping with torque capacity or limitations.

In FIG. 2, the aforementioned throttle valve is indicated generally by the reference numeral 50 and comprises an elongated, window type, generally cylindrical valve member 52 which is reciprocable within a valve sleeve 54. The valve sleeve is also reciprocable in the bore of a suitable valve housing shown by the reference numeral 56 which, for convenience, is shown as a housing for all of the other elements of the fuel control disclosed in FIG. 2. A fuel inlet conduit 58 opens into the valve bore of the housing 56 and a fuel outlet conduit 60 extends from said bore to the combustion section of the engine. One or more fuel inlet windows 62 are provided in the partially hollow valve member 62 for free communication with the inlet conduit 58. One or more outlet windows 64 are provided in the valve member 52 for communication with the outlet conduit 60 through one or more windows 66 provided in the valve sleeve 54.

As shown in the drawing, the valve member 52 and valve sleeve 54 are vertically disposed in the housing bore and it will be apparent that the sleeve 54 can be moved or adjusted within the bore to provide for a minimum effective flow opening or discharge passage between the valve member and the sleeve windows 64 and 66 when the valve member is moved upwardly. A maximum effective opening is provided between the valve and sleeve windows 64 and 66 when the valve member 52 is moved downwardly relative to the sleeve 54. Suitable pressure regulating means (not shown), as for example of the type shown in my co-pending application Serial No. 696,832, filed November 15, 1957, and entitled "Minimum Flow Throttle Valve for a Jet Engine Fuel Control," is provided to cause a substantially constant pressure differential in fuel flow from the conduit 58 to the conduit 60 through the throttle valve in any position thereof whereby relative movement between the valve member 52 and its sleeve 54 to change the effective opening through their respective windows 64 and 66 controls the quantity of fuel flow to the power plant. If the valve 52 is moved downwardly or in one direction with respect to the sleeve 54, the fuel flow opening is increased and fuel flow increases, but if the valve 52 is moved upwardly or in the opposite direction, the fuel flow opening is decreased and the fuel flow decreases.

The throttle valve 52 is biased upwardly or in the flow restricting direction by means of a spring 68 which is interposed between the valve sleeve 54 and a head or flange 70 on the upper end of the throttle valve member 52. The said throttle valve member is thrust downwardly or in the flow increasing direction by forces applied to the top of the said head or flange 70. A servo mechanism 72 controls the said forces applied to the throttle valve and thus controls operation of the throttle valve.

The servo mechanism 72 includes a piston 74 having an elongated extension 75 which is reciprocable within a substantially horizontal bore 76 in the housing 56. The piston 74 defines a pressure regulated servo chamber or actuating chamber 78 within the bore 76 which receives fluid under pressure from a passage 80 which can be connected with a suitable source of fluid at substantially constant pressure. Fluid pressure in the actuating chamber 78 biases the piston 74 in one direction, the left-hand direction as shown in the drawing, and force means are provided to urge or bias the piston 74 in the other or right-hand direction. Said force means is shown for purposes of illustration to constitute a spring 82 disposed within the bore 76 and acting upon the piston 74 oppositely to the regulated fluid pressure in the actuating chamber 78. The free or left-hand end of the piston extension 75 is formed to retain a pair of vertically stacked rollers 84, 84 which bear against the top surface of the throttle valve head plate 70 and against the bottom surface of an inclined bar 86, respectively. As shown in the drawing, the inclination of the bar 86 is such that movement of the servo piston toward the left causes the throttle valve 52 to be moved downwardly in the valve opening and flow increasing direction. As the servo piston is moved toward the right, the throttle valve 52 is moved upwardly by the valve spring 68 in the valve closing and flow restricting direction. Thus, it can be said that the servo mechanism 72 is operable to actuate the throttle valve so as to increase fuel flow with an increase in the regulated servo pressure in the actuating chamber 78 and to decrease fuel flow with a decrease in servo pressure in the said actuating chamber.

As previously mentioned, throttle valve operation and positioning is effected by movement of the power lever 34 which provides a mechanical movement or signal which is scheduled against and influenced by parameters of power plant operation in the form of signals of compressor and first turbine speed, signals of air temperature, and signals of compressor discharge pressure. In the illustrative embodiment of a throttle valve servo mechanism shown, the parameters of power lever setting, speed and temperature are coordinated or scheduled to regulate and control the pressure in the servo mechanism actuating chamber 78, and the parameter or signal of compressor discharge pressure is utilized to control the angle of inclination of the bar 86 whereby its influence is felt in the operation of the throttle valve by the servo mechanism.

To provide for servo pressure control by the parameters of power lever, speed and temperature signals, a conduit 88 having a discharge orifice 90 is connected with the actuating chamber 78 and a pivotally supported flap valve 92 is provided to control the effective opening of the discharge orifice 90 whereby to regulate pressure within the actuating chamber 78. The flap valve 92 is pivoted at 94 and biased in an orifice-opening direction by a spring 96. An arm 98 supporting rollers 100, 100 at its free end is so arranged that the said rollers will engage the flap valve 92 to bias the same in an orifice-closing direction. The said rollers are urged against the flap valve or valve lever 92 at a substantially constant force which is provided by a spring 102. The power lever movement and the speed and temperature signals are coordinated to move the arm 98 to the left and to the right whereby to vary the movement arm of the applied force upon the flap or valve lever 92 and thereby to vary the effective opening of the orifice 90. Suitable motion transmitting means and suitable transducing means (not shown), as for example of the type shown in Patent No. 2,822,666 to S. G. Best, issued February 11, 1958, and entitled "Turbine Power Plant Fuel Control Utilizing Speed, Temperature and Compressor Pressure," are employed to translate the power lever movement and the speed and temperature signals into movement of the arm 98. Thus, the power plant parameters of power lever setting, turbine and compressor speed, and inlet air temperatures vary the fluid pressure in the servo actuating chamber 78 to move the servo piston 74 toward the left and toward the right.

Suitable means such as a bellows 103 connected with the aforementioned element 40 by a conduit 105 is incorporated in the fuel control mechanism to translate the compressor discharge pressure signal into movement of the arm 86 so as to vary its angle of inclination over the throttle valve. Thus, the compressor discharge pressure signal is scheduled against the power lever setting and the compressor speed and air temperature signals in controlling the position of the throttle valve.

The conditions of air temperature, compressor speed, compressor discharge pressure and power lever setting could well be such that a maximum throttle valve open position is provided wherein fuel flow to the turbine engine would be in such quantity as to provide an engine output which would exceed the safe limits of torque in the propeller or rotor drive mechanism. The present invention provides means for modifying the operation of the throttle valve to avoid fuel flow giving rise to engine operation which would exceed torque limitations. The means provided in accordance with the present invention for the aforesaid purpose includes a flap valve or lever 104 which is pivotally supported for movement relative to an orifice 106 in conduit means 108 communicating with the servo chamber 78. The torque conditions can readily be measured or determined by the ram air pressure and by the speed of the so-called free or propeller-driving turbine 26. Therefore, the ram air pressure signal transmitted by the element 44 and the free turbine speed signal transmitted by the gearing 42 are utilized to control the position of torque limiting valve lever 104 whereby to control pressure within the servo mechanism 78 which in turn controls the position of the fuel flow throttle valve 52.

The ram air pressure influence upon the torque limiting valve 104 is accomplished by introducing air at ram pressure or in keeping therewith to a chamber 110 defined in the housing 56. An inlet conduit 112 for the chamber 110 is connected with the aforementioned ram pressure element 44 to provide for such introduction of air to the said chamber. The air within the chamber 110 acts upon a bellows-type diaphragm 114 which is connected as by a link 116 to the torque limiting valve 104 to move it about its pivot 118 in a direction which is counterclockwise on the drawing whereby to increase the effective opening at the nozzle 106. That is, with an increase in ram air pressure, the nozzle opening 106 is increased to reduce the actuating pressure in the servo chamber 78 whereby to move the throttle valve 52 in the flow restricting direction. If ram air pressure is decreased, the torque limiting valve 104 is moved clockwise to relatively close the orifice 106 which results in throttle valve movement to increase fuel flow.

The signal responsive to speed of the free turbine 26 is translated to force by suitable governor means indicated generally at 121 and which acts upon a plunger 120 and a spring 122 to bias the torque limiting valve lever 104 in a counterclockwise, orifice-opening direction. The governor means 121 is shown as being operated by the aforementioned gearing means 42 responsive to speed of the free turbine 26. With a decrease in free turbine speed (an increase in torque) the force applied to the plunger and spring is increased to increase the effective opening of the orifice 106 whereby to decrease or limit fuel flow. With an increase in free turbine speed (torque reduction) the force applied through the plunger 120 and spring 122 is decreased whereby to relatively close the orifice 106 which will cause movement of the throttle valve 52 in the open direction to increase fuel flow.

In addition to the air pressure and turbine speed signals the torque limiting valve lever 104 is positioned by a plunger 124 acting upon a spring 126 interposed between the said plunger and valve lever. A rotatable cam 128 acts upon the plunger 124 and is set by a lever 130 to urge the valve lever 104 in the orifice-opening direction. By adjustment of the cam 128, the force applied to the valve lever 104 is adjusted whereby to select a valve position which will provide for a preselected maximum throttle valve opening and a preselected fuel flow to limit torque at a preselected level.

A feedback mechanism operating between the throttle valve 52 and the torque limiting valve 104 is provided to reposition the said torque limiting valve after the throttle valve has been moved in accordance with the original position of the torque limiting valve. The said feedback mechanism comprises a link 132 which is connected with the throttle valve member 52 at one end and which is pivotally supported at the other end in the housing 56. Thus, in vertical movement of the throttle valve member 52, the link 132 is pivoted in a vertical plane. A plunger 134 is carried by the link 132 for vertical movement and engages against a pivotally supported bell crank or L-shaped arm 136 which applies force through a spring 138 to the torque limiting valve member 104. The force applied by the bell crank and by the feedback mechanism biases the torque limiting valve 104 in the orifice-closing direction in opposition to the power plant parameters or signals and in opposition to the bias of the selected force. Thus, as the throttle valve member 52 moves downwardly to increase fuel flow, the feedback linkage is operated to reduce the force applied to the torque limiting valve in the orifice-closing direction whereby to increase the effective opening of the orifice 106 which causes adjustment of the throttle valve in the flow restricting direction. When the throttle valve member 52 moves in the flow-restricting direction, the feedback linkage increases the force on the torque limiting valve 104 to relatively close the orifice 106 which causes adjustment of the throttle valve in the flow increasing direction.

Reviewing briefly the fuel control mechanism as described above, it will be seen that said mechanism comprises a throttle valve for regulating the flow of fuel from a suitable source of fuel under pressure to the engine or power plant and that the servo mechanism 72 constitutes means which is responsive to a plurality of parameters of power plant operation to control the throttle valve whereby to control the fuel flow. The parameters referred to include the condition of air temperature, the pressure condition at discharge from the compressor, the compressor speed and the power lever setting. The torque limiting fuel control improvements include the means for limiting engine or power plant operation to conform with the torque limitations on propeller or rotor operation. The said torque limiting means is controlled by additional parameters of power plant operation which include the ram air pressure and the speed of the turbine which operates the propeller or rotor. The torque limiting mechanism operates to limit the fuel flow opening through the throttle valve by influencing or controlling pressure in the throttle valve servo mechanism as by bleeding fluid therefrom in keeping with the torque limiting necessity.

The invention claimed is:

1. In a fuel control for connection between a source of fuel under pressure and a power plant which has a combustion chamber and at least one turbine receiving gases therefrom, the combination comprising a throttle valve which is movable in one direction to increase fuel flow from the source to the power plant and in the opposite direction to decrease fuel flow, a servo mechanism for the throttle valve having a pressure regulated chamber for positioning the mechanism and the throttle valve so that fuel flow increases with an increase in regulated pressure and decreases with a decrease in regulated pressure, means responsive to a plurality of parameters of power plant operation for controlling fluid pressure in the chamber, means for limiting the torque output of the power plant comprising means defining a bleed orifice for the chamber, a valve movable with respect to said orifice to control its effective size, force transmitting means responsive to at least one parameter of power plant operation to open said orifice valve, and feedback linkage means interconnecting said throttle valve and said orifice valve to cause opening and closing movements of the latter responsive to opening and closing movements, respectively, of the former.

2. In a fuel control for connection between a source of fuel under pressure and a power plant which has a combustion chamber and at least one turbine receiving gases therefrom, the combination comprising a throttle valve which is movable in one direction to increase fuel flow from the source to the power plant and in the opposite direction to decrease fuel flow, a servo mechanism for the throttle valve having a pressure regulated chamber for positioning the mechanism and the throttle valve so that fuel flow increases with an increase in regulated pressure and decreases with a decrease in regulated pressure, means responsive to a plurality of parameters of power plant operation for controlling fluid pressure in the chamber, means for limiting the torque output of the power plant comprising means defining a bleed orifice for the chamber, a valve movable with respect to said orifice to control its effective size, force transmitting means responsive to turbine speed decrease to open said orifice valve, force transmitting means responsive to power plant air pressure increase to open said orifice valve, and feedback linkage means interconnecting said throttle valve and said orifice valve biasing said orifice valve in a closing direction and responsive to opening and closing movement of said throttle valve to respectively decrease and increase its biasing force on said orifice valve.

3. In a fuel control for connection between a source of fuel under pressure and a power plant which has a combustion chamber and at least one turbine receiving gases therefrom, the combination comprising a throttle valve which is movable in one direction to increase fuel flow from the source to the power plant and in the opposite direction to decrease fuel flow, a servo mechanism for the throttle valve having a pressure regulated chamber for positioning the mechanism and the throttle valve so that fuel flow increases with an increase in regulated pressure and decreases with a decrease in regulated pressure, means responsive to a plurality of parameters of power plant operation for controlling fluid pressure in the chamber, means for limiting the torque output of the power plant comprising means defining a bleed orifice for the chamber, a valve movable with respect to the said orifice to control its effective size, force transmitting means responsive to at least one parameter of power plant operation to open said orifice valve, feedback linkage means interconnecting said throttle valve and said orifice valve and biasing the latter toward closed position and being operable to respectively decrease and increase its biasing force with opening and closing movements of the throttle valve, and means exerting a preselected force on said orifice valve in one direction whereby torque limiting movement thereof is accomplished at a preselected power plant output.

References Cited in the file of this patent

UNITED STATES PATENTS

| | | |
|---|---|---|
| 2,720,752 | Chandler et al. | Oct. 18, 1955 |
| 2,795,107 | Haworth et al. | June 11, 1957 |
| 2,821,065 | Starkey | Jan. 28, 1958 |
| 2,857,741 | Evers | Oct. 28, 1958 |
| 2,910,125 | Best | Oct. 27, 1959 |
| 2,941,601 | Best | Jan. 21, 1960 |

FOREIGN PATENTS

| | | |
|---|---|---|
| 769,103 | Great Britain | Feb. 27, 1957 |